US009928847B1

(12) United States Patent
Cleve et al.

(10) Patent No.: US 9,928,847 B1
(45) Date of Patent: Mar. 27, 2018

(54) SYSTEM AND METHOD FOR ACOUSTIC ECHO CANCELLATION

(71) Applicants: Pascal Cleve, Sudbury, MA (US); Ryo Tanaka, Concord, MA (US)

(72) Inventors: Pascal Cleve, Sudbury, MA (US); Ryo Tanaka, Concord, MA (US)

(73) Assignee: Revolabs, Inc., Sudbury, MA (US)

( * ) Notice: Subject to any disclaimer, the term of this patent is extended or adjusted under 35 U.S.C. 154(b) by 0 days.

(21) Appl. No.: 15/668,938

(22) Filed: Aug. 4, 2017

(51) Int. Cl.
H04B 3/20        (2006.01)
G10L 21/0232     (2013.01)
H04R 1/40        (2006.01)
H04R 3/00        (2006.01)
G10L 21/0208     (2013.01)
G10L 21/0216     (2013.01)
H04M 3/56        (2006.01)

(52) U.S. Cl.
CPC .......... *G10L 21/0232* (2013.01); *H04R 1/406* (2013.01); *H04R 3/005* (2013.01); *G10L 2021/02082* (2013.01); *G10L 2021/02166* (2013.01); *H04M 3/568* (2013.01); *H04R 2201/405* (2013.01)

(58) Field of Classification Search
CPC ...... G10L 21/0232; H04R 1/406; H04R 3/005
See application file for complete search history.

(56) References Cited

U.S. PATENT DOCUMENTS

| 2006/0147063 | A1* | 7/2006 | Chen | H04M 1/03 381/119 |
| 2010/0189274 | A1* | 7/2010 | Thaden | G10L 21/02 381/66 |
| 2011/0293103 | A1* | 12/2011 | Park | G10K 11/1782 381/57 |
| 2013/0287216 | A1* | 10/2013 | Eriksson | G10L 21/02 381/59 |
| 2017/0171396 | A1* | 6/2017 | Sun | H04B 3/235 |

* cited by examiner

*Primary Examiner* — Simon King
(74) *Attorney, Agent, or Firm* — Robert Schuler (57) ABSTRACT

An audio or video conferencing system having an array comprised of two or more microphones and having one or more loudspeakers positioned proximate to the microphones. The conferencing system also has acoustic echo cancellation (AEC) functionality that removes direct and reverberant acoustic echo from microphone signals in two separate acoustic echo cancellation operations. The first AEC operation removes direct acoustic echo prior to a beamforming operation, and the second AEC operation removes reverberant acoustic echo from a microphone signal subsequent to the beamforming operation.

20 Claims, 8 Drawing Sheets

AUDIO CONFERENCING SYSTEM 100

SYSTEM AND METHOD FOR ACOUSTIC ECHO CANCELLATION

1. FIELD OF THE INVENTION

The present disclosure relates to an acoustic echo canceller that removes audio signal information received by a microphone directly from a loudspeaker.

2. BACKGROUND

Meetings between multiple individuals conducted in two or more locations that are remote to each other can be facilitated using audio or video conferencing systems. These systems typically include some number of microphones, at least one loudspeaker, a camera, audio and video signal processing, and means for connecting the system to a public or private network. In such a system, microphones can operate to pick up near end (N.E.) acoustic audio signals (speech) from an audio source, and digitally process the audio signals in a number of ways before sending them over the network to a far end (F.E.) communication device (i.e., another conferencing system or communication device) to be played by a loudspeaker. Among other things, the digital processing functionality can operate to remove acoustic echo present in a N.E. audio signal prior to its being transmitted to a F.E. system.

Audio and video conferencing systems can have an array comprised of multiple microphones in fixed positions with respect to the environment in which they operate, or the microphones can be mobile, wireless devices that are carried or worn by individuals participating in a conferencing session. In the case that a conferencing system has an array of multiple microphone in fixed positions, it is possible to determine a direction of an audio source with respect to the microphones, and then form and steer a microphone beam towards the direction of the audio source. This technique is known as spatial filtering, and implementing this technique in a conferencing system has the effect of capturing more of an audio signal directly from an audio signal source and less of the audio signal that is reflected from the surfaces of a room that the system is operating in. A beam is typically characterized by a beam width that can be expressed in degrees, and each beam can be the same width or each beam can be a different width. In the case of fixed beamforming, each beam is oriented in a direction with respect to the microphone array in order to receive audio signals from a particular direction. Spatial filtering is typically implemented in system with a fixed array of microphone in order to achieve a higher quality signal to acoustic echo cancellation functionality, which ultimately results in a higher quality audio signal being sent to a far-end location.

Figure 1:
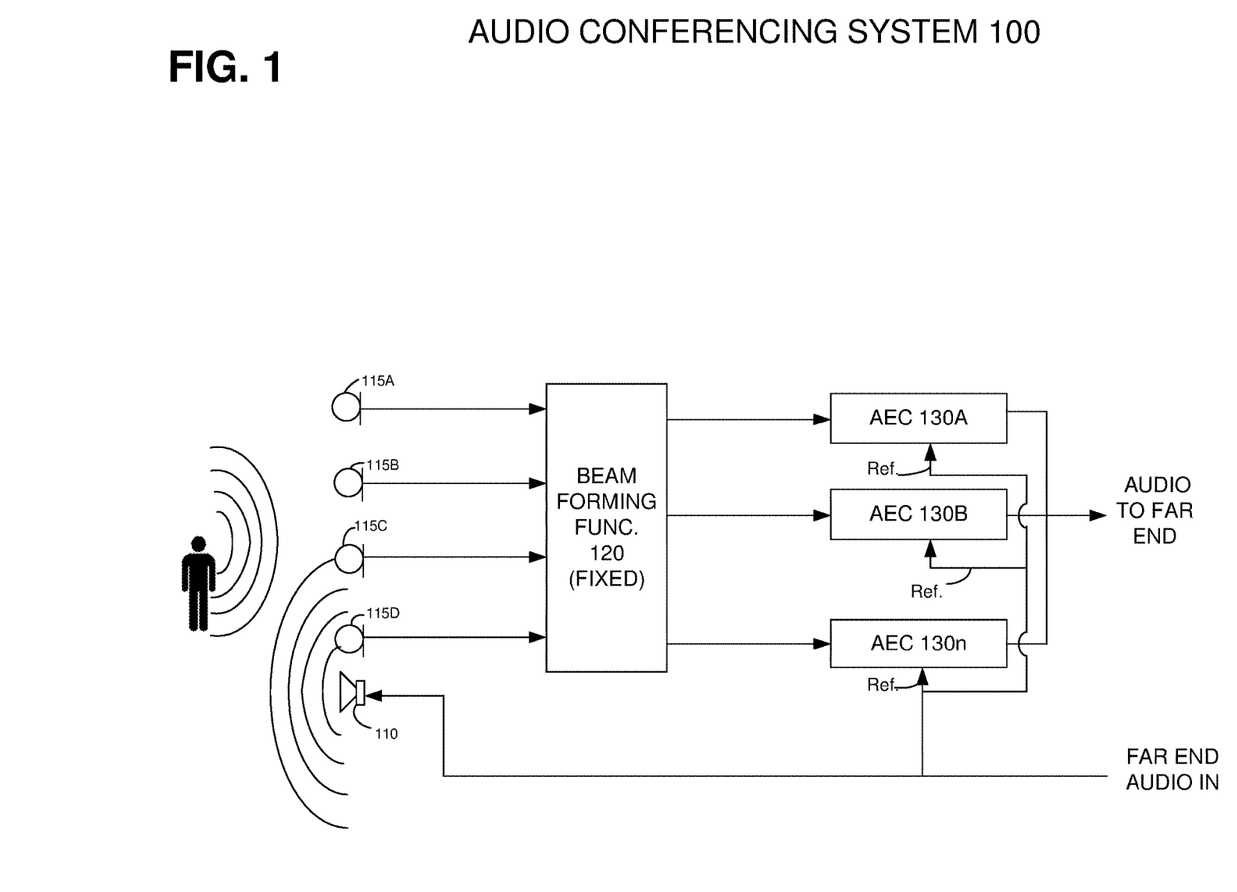
FIG. 1 is a diagram showing functional elements comprising an audio conferencing system 100.

FIG. 1 is a diagram showing functional elements comprising a typical audio conference system 100. The system 100 is shown to have four microphones 115A to 115D, one loudspeaker 110, a beamforming function 120, and separate acoustic echo cancellation functionality, AEC 130A to 130n, for each one of a beam generated by the beamformer 120. Acoustic echo cancellation is an essential function performed by audio or video conferencing systems, and it generally operates to remove acoustic echo from a near-end audio signal prior to the signal being transmitted to a remote location. Specifically, acoustic echo occurs when a far-end audio signal, received and played by a N.E. system loud speaker, is picked up by a microphone proximate to the loud speaker. An audio signal captured by the local microphone will include at least some of the far-end audio signal information, and this audio information can be transmitted back to the far-end system where it can be heard as an echo. This acoustic echo is distracting and can severely degrade the quality of an audio conferencing session if it is not cancelled.

The conferencing system illustrated in FIG. 1 is configured such that the beamforming function 120 receives audio signal information directly from each of the four microphones, uses this information to determine a direction of an audio source, and then selects and directs one of three (in this case) microphone beams in the direction of the audio source. The audio signal information captured by the selected microphone beam is then processed by one of the three (in this case) acoustic echo cancellers, AEC 130A to 130n, and the resulting echo cancelled audio signal can be sent to a far-end device to be played. The advantage in performing the beamforming prior to echo cancellation is that the audio signal being processed by the echo cancellers is of higher quality (i.e., higher signal to noise ratio), and the number of separate echo cancellers can be limited to the number of beams, regardless of the number of microphones in an array.

Figure 2:
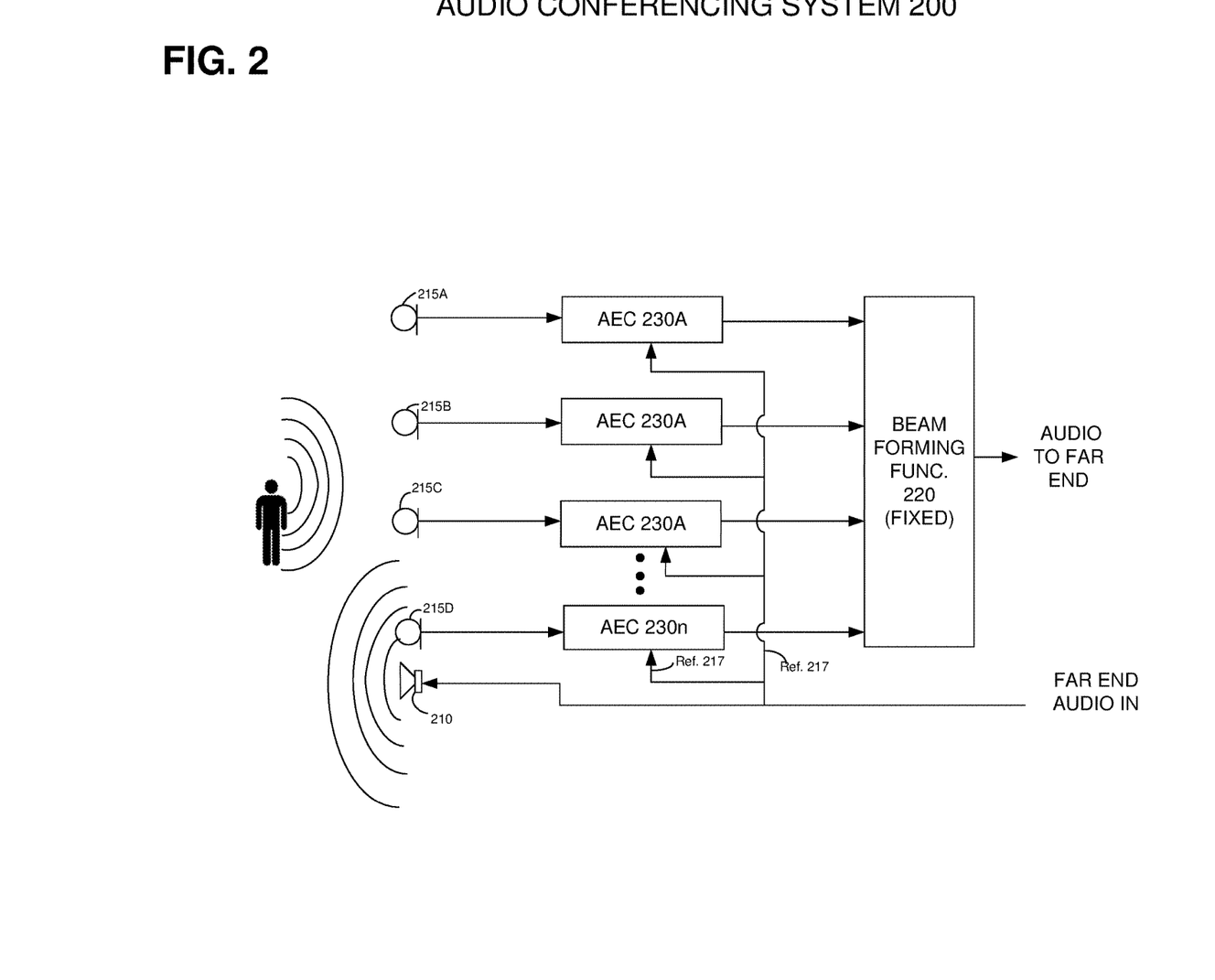
FIG. 2 is a diagram showing functional elements comprising an audio conferencing system 200.

While performing the beamforming operation first limits the number of echo cancellation functions to the number of beams, the beamforming function is influenced by acoustic signals received directly from any loudspeakers that are proximate to microphones in an array. In order to limit the influence of these speaker signals, the acoustic echo cancellation operation can be performed prior to the beamforming operation. Such a configuration is illustrated in FIG. 2.

3. BRIEF DESCRIPTION OF THE DRAWINGS

The present invention can be best understood by reading the specification with reference to the following figures, in which.

4. DETAILED DESCRIPTION

While there are advantages to configuring an audio conferencing system to operate using either the beamformer first or the acoustic echo cancellation first methodologies, both methodologies do have shortcomings. Specifically, if the beamformer first method is employed, audio signals received by microphones directly from a loudspeaker can hinder the ability of the beamformer to steer a beam in the correct direction, or interfere with the selection of an optimum beam to use by masking the position of an audio source of interest, therefore compromising the quality of the signal information used by the acoustic echo canceller. While, the echo cancellation operation first method does improve the performance of the beamformer by removing some or all of the acoustic signal received by the microphones directly from the loudspeakers, it requires that separate echo cancellers be implemented for each microphone in the array, which adds cost and computational complexity to the system.

Our solution to this problem is to perform the acoustic echo cancellation operation twice. Acoustic echo cancellation is performed a first time on audio signals received from each one of a plurality of microphones in a microphone array, and acoustic echo cancellation is performed a second time using the audio signals captured by the microphones subsequent to a beamforming operation. More specifically, the first acoustic echo cancellation operation operates on one or more microphone signals to remove some or all of audio information associated with an acoustic signal received by the microphones directly from a loudspeaker. The audio information is referred to here as direct acoustic echo, or direct echo. The direct echo removed audio signal resulting from the first acoustic echo cancellation (AEC) operation is used by a beamforming function to select or steer a microphone beam (fixed or dynamic beamformer respectively) to the direction of an audio source. One or more microphone signals generated subsequent to a microphone beam being selected or steered towards an audio source is then operated on by a second acoustic echo cancellation function to remove some or all of an audible, reverberant acoustic echo arriving at the microphones as the result of loudspeaker signal reflection, or ambient acoustic audio signal reflection, from the surfaces of the environment in which the conferencing system is operating. The first AEC operation employs adaptive filters that are designed to only operate on microphone signals for as long as necessary to remove enough of the direct echo to allow the beamformer to operate correctly, and the second AEC operation employs adaptive filters that are designed to only operate as long as necessary to remove substantially all of the audible, reverberant component of the acoustic echo.

The adaptive filters employed by the first AEC operation only need to operate on an acoustic signal for a short (typically quantifiable) period of time with a known starting and ending time with respect to a direct echo signal. Regardless of the number of microphones in an array, since the design parameters of this adaptive filter are known, and the number of filter coefficients are relatively few, these filters are inexpensive to implement. Then, once the direct echo component of the microphone signal is removed (i.e., the first AEC operation can remove up to 20 dB of acoustic energy from the direct echo signal), the beamformer is not hindered by the direct echo, and this operation can be performed more accurately so that a beam can be selected or steered quickly toward an audio source of interest. Subsequent to the beamforming operation, the second AEC operation uses the audio signals received by the microphones to remove substantially all of the audible acoustic echo component of the audio signal associated with the reverberant energy, or to remove at least enough acoustic echo so that it does not denigrate the quality of a communication session (i.e., the second AEC operation can remove from 10 dB to 20 dB or more of the acoustic echo from the microphone signal . . . the amount of acoustic echo removed can be a qualitative measure, and the amount of energy needed to be removed can depend upon the reverberant characteristics of the room in which the conferencing system is operating). While the adaptive filters implemented in each acoustic echo canceller associated with the second AEC operation are computationally more complex, and therefore more expensive to implement, fewer of these more expensive adaptive filters are needed in a conferencing system. In the case where a fixed beamformer is employed, only one adaptive filter need be included for each fixed beam, and in the case where a beamformer dynamically selects the direction to steer a beam, only one adaptive filter is needed. Configuring an audio or video conferencing system in this manner lowers the expense associated with designing and implementing computationally intensive adaptive filters, and increases the performance of the beamforming functionality. An implementation of the two step acoustic echo cancellation methodology will now be described below with reference to FIG. 3.

Figure 3:
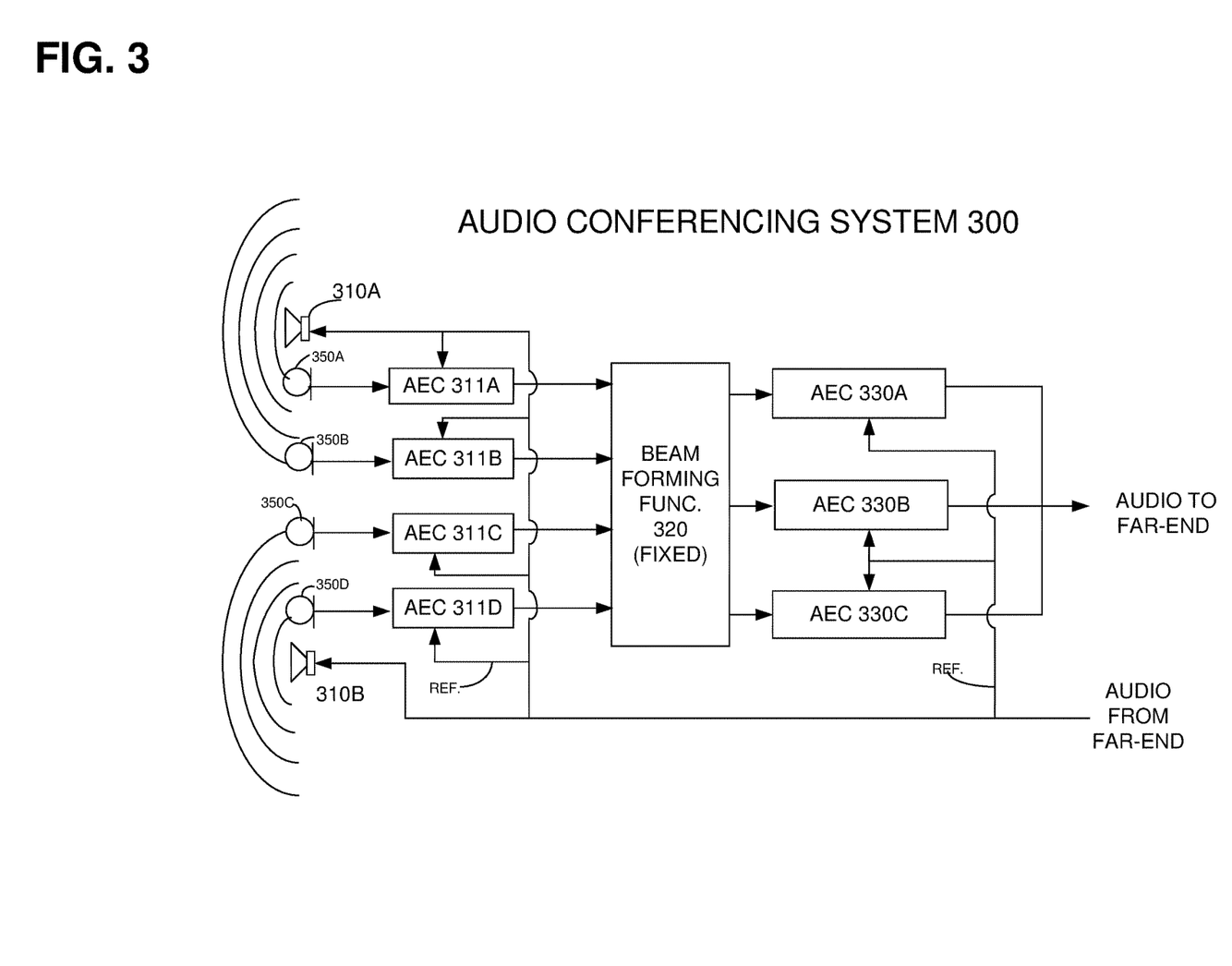
FIG. 3 is a diagram showing functional elements comprising an audio conferencing system 300.

An audio conferencing system 300 illustrated in FIG. 3 has an array of four microphones 350A to 350D, two loudspeakers 310A and 310B, four acoustic echo cancellers (AEC 311A to AEC 311D, collectively referred to here as AEC 311) for performing a first AEC operation, a beam former 320, and three acoustic echo cancellers (AEC 330A, 300B and 330C, collectively referred to here as AEC 330) for performing a second AEC operation. The four microphones are arranged in fixed positions with respect to each other and with respect to the loudspeakers. According to one embodiment, the microphones and the loudspeakers are arranged in a straight line and in the same vertical plane. According to another embodiment, the microphones are arranged in a straight line in the same vertical plane, and the loudspeakers are arranged in fixed positions, but not in the same line or vertical plane as the microphones. This system 300 can have more or fewer microphones, it can have more or fewer loudspeakers, and the number of the acoustic echo cancellers, AEC 311, that are implemented in the system is directly related to the number of microphones. Each of the acoustic echo cancellers, AEC 311, is specially designed to only remove substantially all of the direct echo received by the microphone from the loudspeakers. The design of each one of the acoustic echo cancellers 311 associated with each microphone depends upon the distance from each microphone to each loudspeaker. For example, the microphone 350A is closer to speaker 310A than the other microphones in the array, and so the AEC associated with this microphone can be designed so that it operates to remove direct echo for only as long as it takes an acoustic wave to travel from the speaker 330A to the microphone 350A. Since the distance between the loudspeaker and the microphone is known, and the speed of sound through air is fairly constant, the AEC 311A can be designed to operate to only remove the acoustic energy arriving at the microphone directly from the speaker. The closer the AEC is to a microphone, the simpler the AEC design can be, and vice versa. The design of the AEC 311 will be described in more detail later with reference to FIG. 5, Continuing to refer to FIG. 3, the beamforming function 320 generally operates to determine an audio source direction, and then to select a beam that receives acoustic signals from that direction. Any number of beamforming techniques can be employed to implement the beamforming function 320, and all of these techniques are well known, so they will not be discussed here. The technique implemented in the conferencing system 300 is a fix type beamformer, and in this case the beamformer can select any one of three pre-calculated beams with which to receive acoustic signals energy. Each of the beams can receive acoustic signal energy from directions that are determined according to the shape or size of a meeting room or conference table for example. The number of acoustic echo cancellers (AEC 330) is determined by the number of fixed beams implemented in the function 320, and so in this case, the system 300 has three echo cancellers AEC 330A, 330B and 330C. Each one of these echo cancellers is specially designed to remove acoustic echo from microphone signals resulting from loudspeaker audio signals reflecting from surfaces present in the environment in which the system 300 is operating.

The three acoustic echo cancellers, AEC 330A, 330B and 330C, perform a second acoustic echo cancellation process on direct echo removed microphone signals subsequent to the beamforming process. The design of these echo cancellers depends to a large extent on the time it takes reverberant energy to arrive at the microphones, and how long this reverberant energy persists in the environment in which the system 300 is operating. Additionally, it is only necessary to implement one AEC 330 for each fixed beam that can be selected by the beamforming function 320. The design of one acoustic echo canceller, AEC 330, will be described later in detail with respect to FIG. 6. While the implementation of acoustic echo cancellation described here with reference to FIG. 3 is embodied in the audio conferencing system 300, it can also be embodied in a video conferencing system as well, and for the purposes of this description, and audio or a video conferencing system can be considered a conferencing system.

Figure 4:
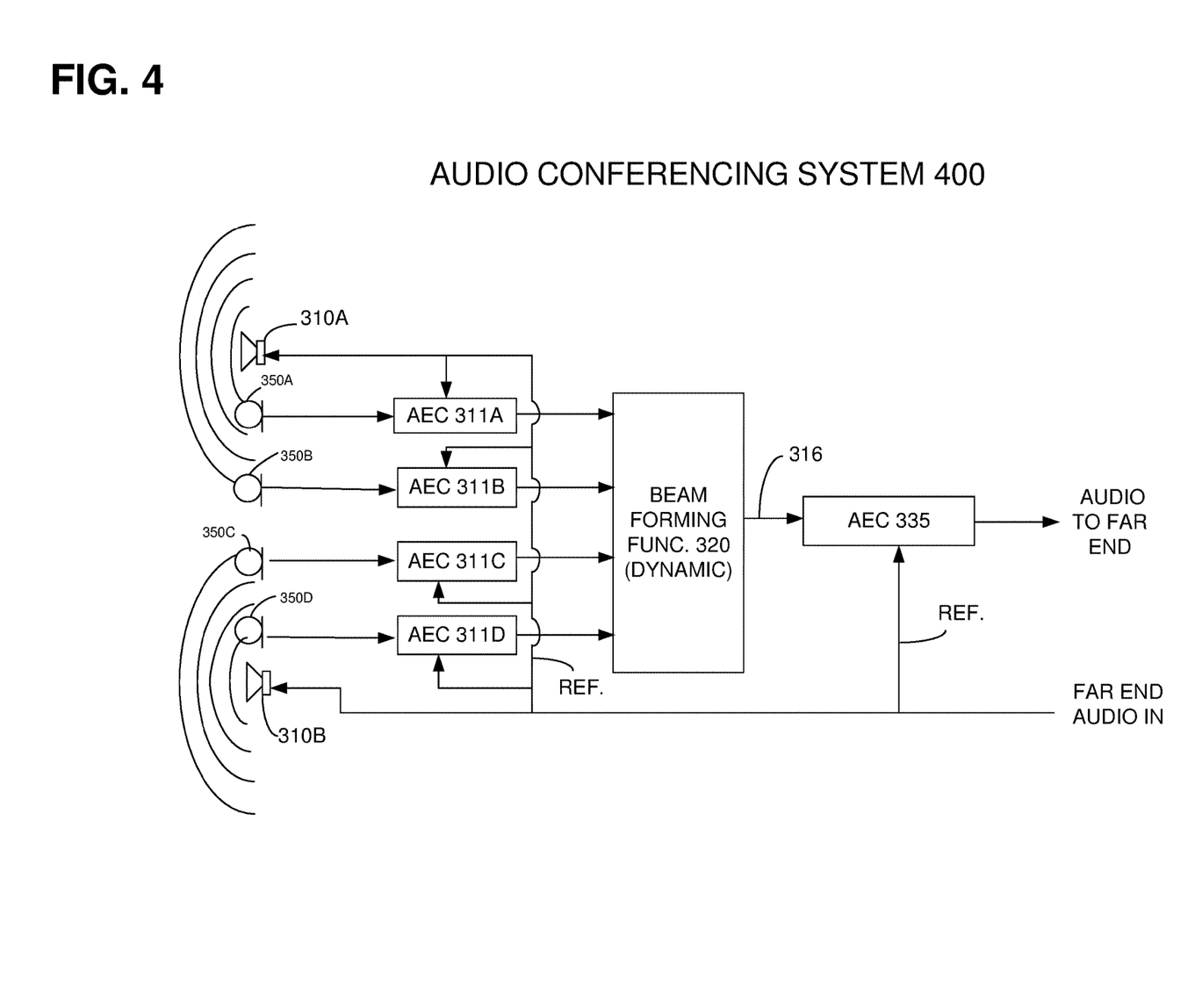
FIG. 4 is a diagram showing functional elements comprising an audio conferencing system 400.

Referring now to FIG. 4, an audio conferencing system 400 is shown that is substantially similar to the system 300 described with reference to FIG. 3, with the exception that the beamforming function 320 is designed to dynamically steer a microphone beam towards an acoustic source of interest, and only one AEC 335 is implemented to perform the second acoustic echo cancellation operation. The design of a beamformer that is capable of dynamically steering a microphone beam in a direction from which an acoustic signal of interest is generated is well known, and so will not be described here. The AEC 335 should be designed so that it is capable of processing an acoustic signal to remove echo that arrives at the microphone from any direction, and so this echo cancellation process may be somewhat more computationally intensive than the echo cancellation process implemented by the AEC 330 implemented in the system 300 described with reference to FIG. 3, but in the case of system 400, only one AEC is implemented, which does mitigate the cost of implementing multiple echo cancellers. As with the system 300, the audio conference system 400 performs two separate acoustic echo cancellation operations, with the first operation being performed prior to beamforming, and the second operation being performed subsequent to steering a microphone beam.

Figure 5:
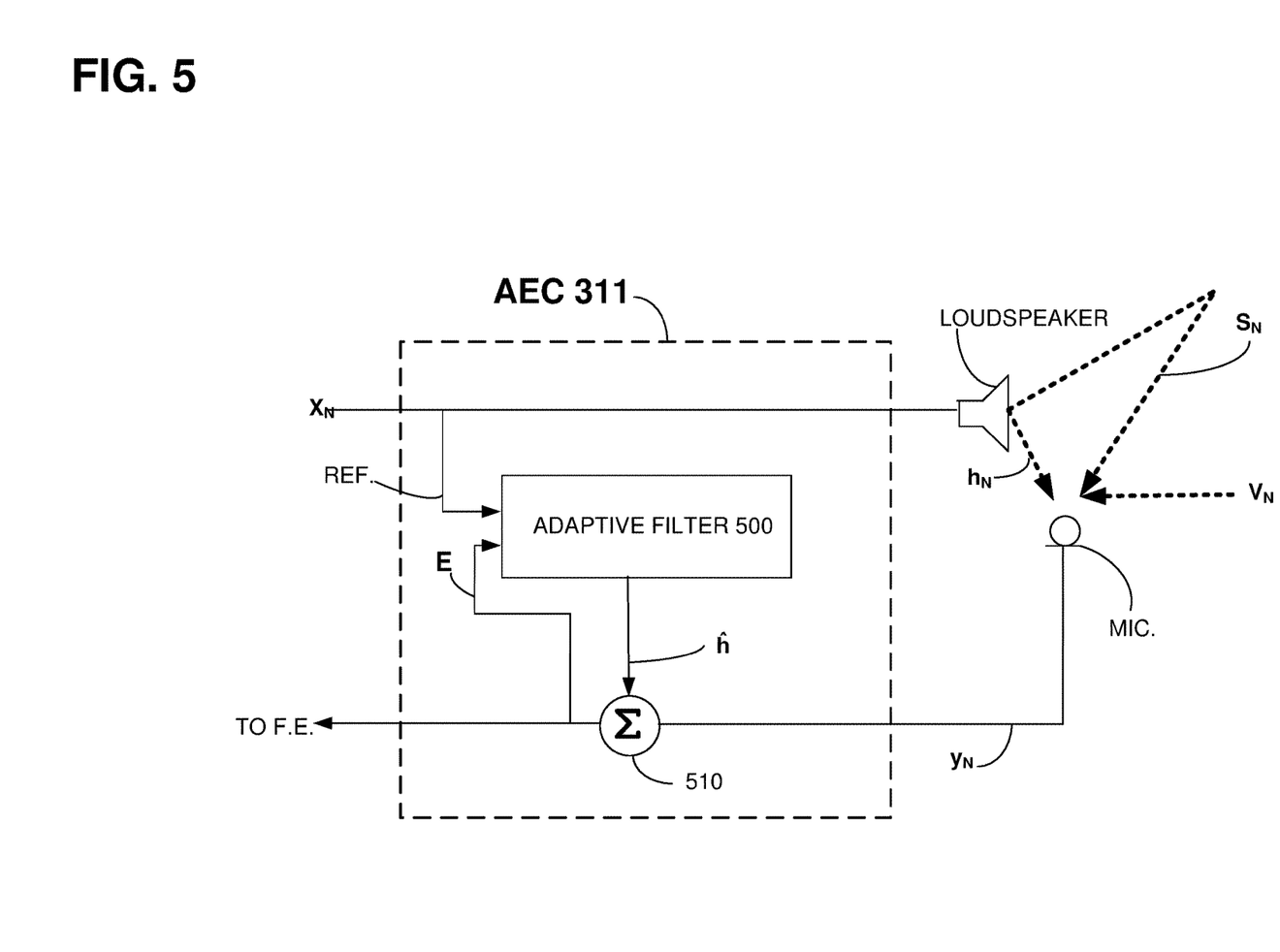
FIG. 5 is a diagram showing the functional elements comprising any of the acoustic echo cancellation functionality shown in FIG. 3 or 4.

Referring now to FIG. 5, the components of an AEC function, that operates to remove acoustic echo from a microphone signal, is shown to have an adaptive filter 500 and a summation function 510. This AEC function is representative of any of the acoustic echo cancellation functions 311, 330 or 335 described with reference to FIGS. 3 and 4. In operation, a far-end audio signal $X_N$ is received at an audio conferencing system (i.e., the system 300) and sent to both a loudspeaker and to the adaptive filter 500 which operates to, among other things, use the input signal $X_N$ and an error signal E to calculate an estimated echo signal $\hat{h}$ which is sent to the summation function 510. The far-end audio signal $X_N$ sent to the loudspeaker is played, and the microphone proximate to the loudspeaker can receive an audio signal h (direct echo signal) that includes $X_N$ signal audio information transformed by an echo path that exists between the loud speaker and the microphone. This echo path can be modeled as a room impulse response, which in this case is represented by an acoustic signal $h_N$. A local audio signal $V_N$ (generate by one or more individuals speaking into a local microphone), and signals played by the loud speaker and reflected to the microphone, referred to here as a reflected signal $S_N$, are combined into a microphone signal $Y_N$ and sent to the summation function 510. The summation function 510 generally operates to subtract the estimated echo signal $\hat{h}$ from the microphone signal $Y_N$ which results in an error signal E that is an input to the adaptive filter 20 and which can be transmitted to a far-end audio system. More specifically, the error signal is operated on by an adaptive algorithm to calculate a set of coefficients W. The coefficients calculated by the adaptive algorithm are used by the filter 500 to operate on the far-end signal $X_N$ to generate the estimated echo signal $\hat{h}$. The objective of the adaptive algorithm is to calculate or update filter coefficients such that the adaptive filter is able to minimize the error signal value, which in an ideal case is zero. The design of an adaptive filter 312A that can be implemented in any of the acoustic echo cancellers 311 is illustrated below with reference to FIG. 6.

Figure 6:
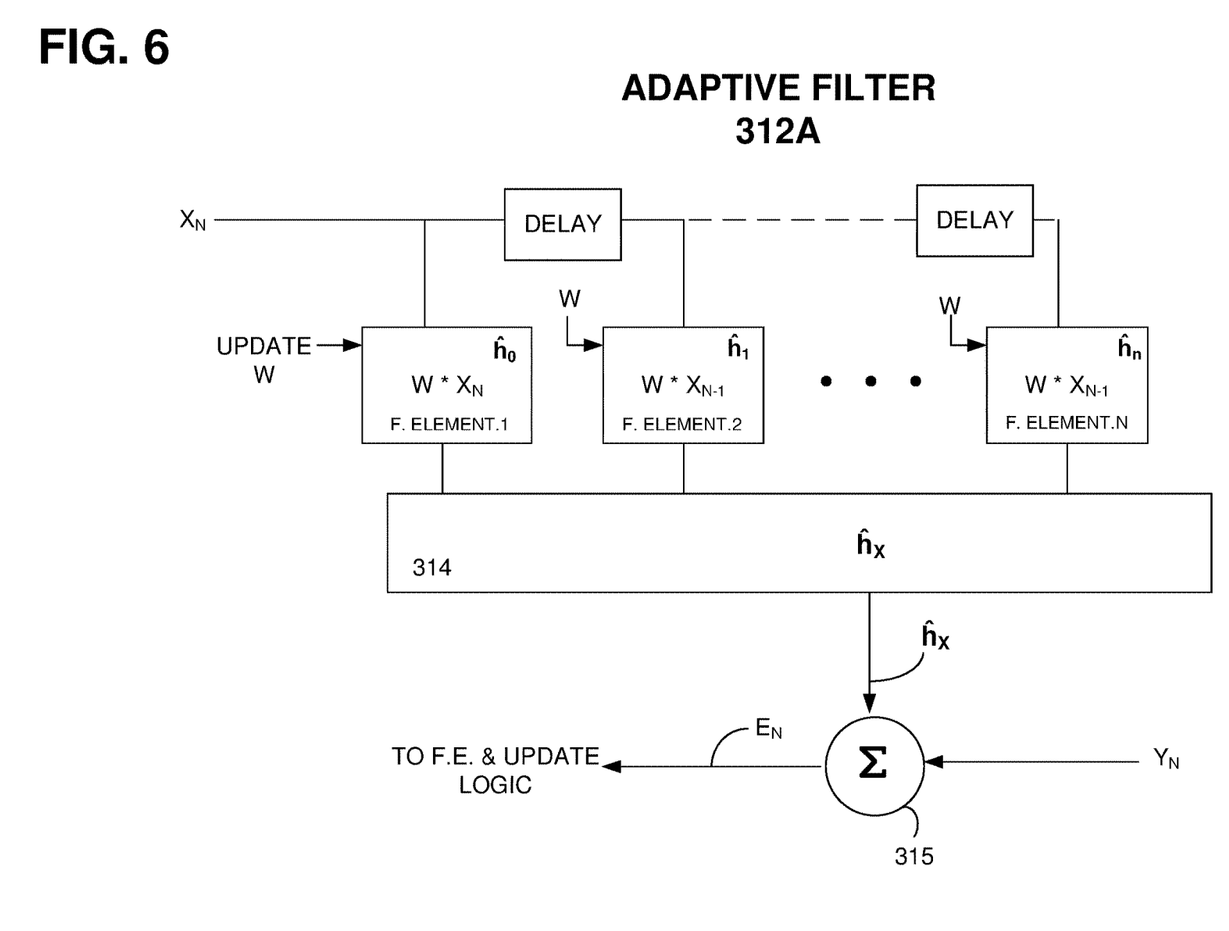
FIG. 6 is a diagram showing a design for an adaptive filter 312A that can be implemented in any of the acoustic echo cancellation functions AEC 311A to 311D shown in FIG. 3 or FIG. 4.

The adaptive filter 312A in FIG. 6 is shown to have a plurality of filter elements labeled F.ELEMENT.1 TO F.ELEMENT.N, with N being an integer number, and the adaptive filter has a plurality of delay elements, which represents a time delay to shift the signal $X_N$ (or a sample of the signal) from one location in a FIFO to another location, for instance, and the delay element is used to temporarily store an audio signal sample, such as a sample of the signal $X_N$, so that the audio information in the sample can be operated on by a filter element. As the filter 312A is designed to only remove direct echo received at a microphone from a loudspeaker, the number of filter elements (length) comprising this adaptive filter is determined by the time it takes for a loudspeaker signal to arrive at a microphone, which is typically just a couple of milliseconds in a room audio conferencing system. In one embodiment, the adaptive filter 312A is designed to operate on audio information received from a microphone for 10 ms, which in this case equates to a single frame of audio information. At a sampling rate of 32 kHz, the adaptive filter 312A would have 320 filter elements. While the embodiment of the adaptive filter 312A described above has 320 filter elements, this filter can have fewer or more elements, but it should be understood that the number of elements is dictated, at least in part, by the distance between each microphone and a loudspeaker. In the case where a system has more than one loudspeaker, and the distance from each loudspeaker to a microphone is different, then it would be good practice to consider the arrival time from the furthest loudspeaker when designing the filter.

The adaptive filter 312A in FIG. 6 also has a summing function 314 that operates to add together the estimate echo signals output by each of the filters element, Element.1 to Element.N, and the summed echo signal estimates are sent to a summation function 315 as a signal $\hat{h}_x$. The summed echo signal estimate $\hat{h}_x$ is subtracted in the summation function from a microphone signal $Y_N$ which results in an error signal $E_N$ which is sent to a filter control or adaptive algorithm (not shown) and to a far-end audio system. The filter control uses the error signal $E_N$ and a sample of the signal $X_N$ to calculate an updated coefficient value for each of the active filter elements.

Figure 7:
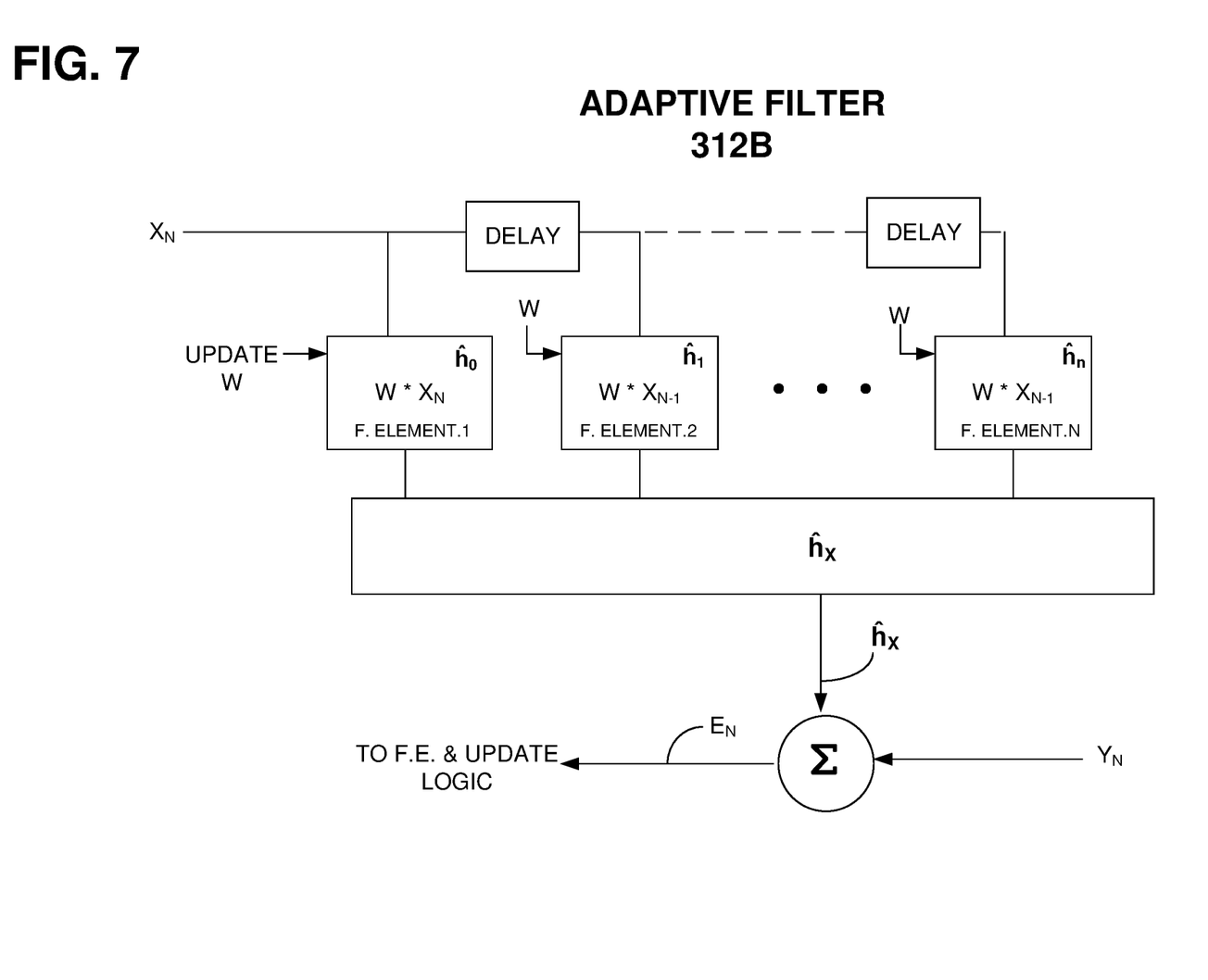
FIG. 7 is a diagram showing a design for an adaptive filter 312B that can be implemented in any of the acoustic echo cancellation functions AEC 330A to 330n in FIG. 3 and in AEC 335 in FIG. 4.

The design of an adaptive filter 312B that can be implemented in any of the acoustic echo cancellers 330A, 330B, 330C and 335 is illustrated below with reference to FIG. 7. In contrast to the design of the adaptive filter 312A described earlier in FIG. 6, the adaptive filter 312B is designed to remove acoustic signal information that arrives at each microphone after being reflected from a surface in the environment in which the conferencing system is operating. This reverberant energy takes longer to arrive at a microphone, than does the direct echo, after being played by a loudspeaker, and this reverberant energy persists in the environment and can be detected by microphone for a time that is determined by, among other things, room dimensions and the reflective characteristics of the room surfaces. It is not unreasonable to expect that this reverberant energy can persist in a room for several hundred milliseconds, Accordingly, the adaptive filter 312B should be designed to have at least a number of filter elements needed to process this reverberant energy for as long as it is detectible by the conferencing system microphones. In this regard, the adaptive filter 312B is designed to have more filter elements than the filter 312A described with reference to FIG. 6, and regardless of the size of a room in this the conferencing system is operating and the characteristics of the reflective surfaces, the number of filter elements implemented in the adaptive filter 312B is always greater than the number of filter elements implemented in the adaptive filter 312A. According the embodiment in FIG. 7, the adaptive filter 312B is designed to operate on audio information received from a microphone for up to 20 msec, which in this case equates to twenty frames of audio information, or 6400 samples of audio information received from a microphone.

Figure 8:
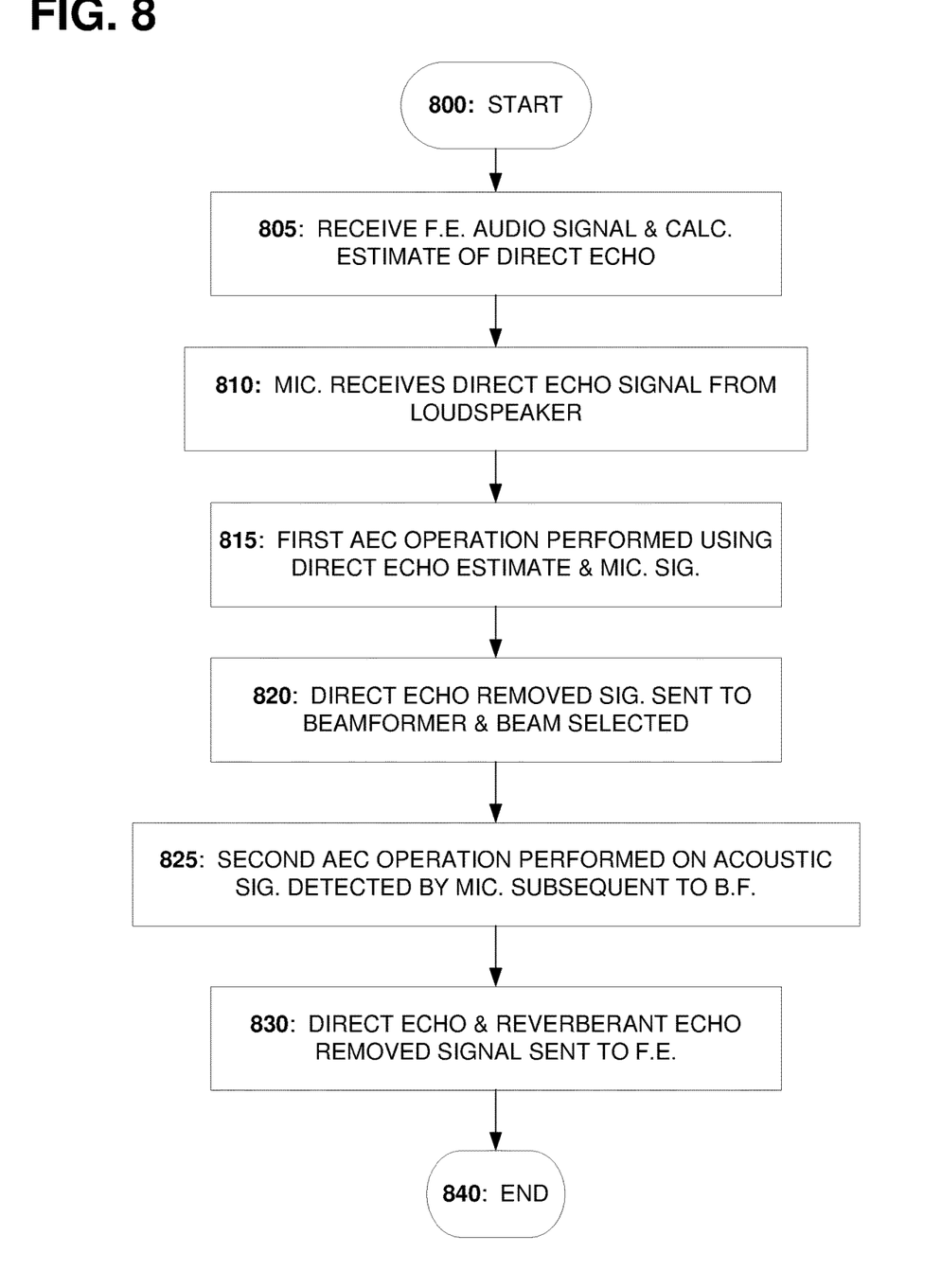
FIG. 8 is logical flow diagram of the process of an embodiment of the invention.

The procedure followed by the audio conferencing system 300 described with reference to FIG. 3 to remove both direct echo energy and reverberant echo energy from a microphone signal will now be described with reference to FIG. 8. The process starts at 800, and at 805 the system 300 receives a far-end audio signal and plays it. Each of the four AEC functions operate on the F.E. signal to calculate an estimate of direct echo, and at 810 each microphone receives a direct echo signal from the loudspeaker. At 815, each AEC function removes this estimate from a reference signal, which is the far-end audio signal received by the system 300, and at 820 sends the direct echo removed audio signal to the beamformer. The beamformer processes each of the direct echo removed signals to determine a direction, with respect to the microphone array, of an audio source (which in this case can be a person), and then selects one microphone beam to capture acoustic information from that source. Removing the direct echo component from the acoustic signal allows the beamforming function to operate more rapidly, and accurately to identify a direction of an audio source. Then at 825, the direct echo removed acoustic signal information captured by the microphones is processed by the second AEC operation, and some or substantially all of the reverberant acoustic information is removed from the microphone signal. Then at 830, the direct echo and reverberant echo removed audio signal is sent by the system 300 to a far-end audio device.

While the procedure to remove both direct echo and reverberant echo from an acoustic signal captured by a microphone is illustrated and described with reference to FIG. 8 in the context of a fixed beamformer, this methodology can just as easily be implemented in a conferencing system using a dynamic beamformer, and either methodology can be implemented depending upon the use and the demands of the system. An advantage in implementing the fixed beamformer is that each AEC function will tend to converge to a solution more rapidly than if a dynamic beamformer is employed. On the other hand, only one AEC function needs to be implemented in a dynamic beamformer system.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A conferencing system, comprising:
    a microphone array having two or more microphones;
    at least one loudspeaker in a fixed spatial relationship with respect to each of the two or more microphones in the microphone array;
    a microphone array beamforming function; and
    a first acoustic echo cancellation function operating to only remove direct acoustic echo information from microphone signals generated by any one or more of the microphones, and a second acoustic echo cancellation function operating to remove audible, reverberant acoustical echo information from microphone signals generated by any one or more of the microphones subsequent to the beamforming function steering a microphone beam in the direction of an audio source.

2. The conferencing system of claim 1, wherein the microphone array beamforming function is fixed or dynamic.

3. The conferencing system of claim 2, wherein a single acoustic echo cancellation function is implemented in association with the dynamic beamforming function.

4. The conferencing system of claim 1, wherein the two or more microphones are fixedly arranged in a with respect to each other.

5. The conferencing system of claim 1, wherein the two or more microphones are fixedly arranged in a same vertical plane with respect to each other.

6. The conferencing system of claim 5, further comprising the loudspeakers are fixedly arranged in the same vertical plane as the microphones.

7. The conferencing system of claim 5, further comprising the loudspeakers are not fixedly arranged in the same vertical plane as the microphones.

8. The conferencing system of claim 1, wherein the microphone array, the microphone beamforming function, the at least one loudspeaker, and the first and second echo cancellation functions are located in one physical device.

9. The conferencing system of claim 1, wherein the reverberant acoustic echo removed audio signal is transmitted over a network to a far-end device.

10. A method of acoustic echo cancellation, comprising:
    receiving a far-end audio signal at a conferencing system having a first acoustic echo cancellation function which operates on the far-end audio signal to only calculate an estimate of a direct acoustic echo; and receiving a microphone signal, at the first acoustic echo cancellation function, from one of a plurality of microphones in a microphone array, and using the direct acoustic echo estimate to remove the estimated direct acoustic echo from the microphone signal;

wherein, the direct acoustic echo is received by the one of the plurality of the microphones from one or more loudspeakers.

11. The method of claim 10, further comprising the conferencing system having a fixed or a dynamic microphone array beamforming function.

12. The method of claim 11, wherein the fixed microphone array beamforming function uses the direct acoustic echo removed microphone signal to determine a direction of an audio source, and to select one of a plurality of pre-calculated microphone array beams that is oriented in the direction of the audio source, or the dynamic microphone array beamforming function uses the direct acoustic echo removed microphone signal to determine a direction of an audio source, and to steer a microphone array beam in the direction of the audio source.

13. The method of claim 12, further comprising the conferencing system having a second acoustic echo cancellation function which operates on a far-end audio signal to calculate an estimate of acoustic echo information; and receiving, from a microphone, at the second acoustic echo cancellation function a microphone signal generated subsequent to the beamforming function orienting a microphone array beam in the direction of the audio source, and using the acoustic echo estimate to remove substantially all audible, audio information associated with acoustic echo from the microphone signal;

wherein the acoustic echo is associated with the one or more loudspeakers playing a far-end audio signal which is reflected from the surfaces of an environment in which the conferencing system is operating.

14. The conferencing system of claim 11, wherein a single acoustic echo cancellation function is implemented in association with the dynamic beamforming function.

15. The conferencing system of claim 10, wherein the plurality of microphones in the microphone array are fixedly arranged in a straight line with respect to each other.

16. The conferencing system of claim 10, wherein the plurality of the microphones in the microphone array are fixedly arranged in the same vertical plane with respect to each other.

17. The conferencing system of claim 10, further comprising the one or more loudspeakers are fixedly arranged in the same straight line and vertical plane as the microphones.

18. The conferencing system of claim 10, further comprising the loudspeakers are not fixedly arranged in the same vertical plane as the microphones.

19. The conferencing system of claim 13, wherein the microphone array, the microphone beamforming function, the at least one loudspeaker, and the first and second echo cancellation functions are located in one physical device.

20. The conferencing system of claim 13, wherein the reverberant acoustic echo removed audio signal is transmitted over a network to a far-end device.

* * * * *